(12) United States Patent
Frisch et al.

(10) Patent No.: US 7,997,530 B2
(45) Date of Patent: Aug. 16, 2011

(54) AIRPLANE FAIRING PANEL ADJUSTABLE FITTING ASSEMBLY, KIT AND METHOD

(75) Inventors: Douglas A. Frisch, Renton, WA (US); Marc J. Piehl, Renton, WA (US); Kirk B. Kajita, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 683 days.

(21) Appl. No.: 12/138,161

(22) Filed: Jun. 12, 2008

(65) Prior Publication Data

US 2009/0314894 A1    Dec. 24, 2009

(51) Int. Cl.
*B64C 17/00* (2006.01)
(52) U.S. Cl. .................................... 244/117 R; 244/131
(58) Field of Classification Search .................. 244/131, 244/117 R; 52/793.1, 787.1, 787.12; 411/82, 411/34; 428/593, 116
See application file for complete search history.

(56) References Cited

U.S. PATENT DOCUMENTS

| | | | | |
|---|---|---|---|---|
| 3,662,805 A | * | 5/1972 | Sygnator | 52/787.12 |
| 4,273,818 A | * | 6/1981 | Buchs | 52/787.12 |
| 4,719,727 A | * | 1/1988 | Cooper et al. | 52/787.1 |
| 5,071,092 A | | 12/1991 | Williams et al. | |
| 5,093,957 A | * | 3/1992 | Do | 52/787.1 |
| 5,240,543 A | * | 8/1993 | Fetterhoff et al. | 411/82 |
| 5,876,088 A | | 3/1999 | Spears | |
| 6,889,939 B2 | | 5/2005 | Rouyre et al. | |
| 7,216,922 B2 | | 5/2007 | Tuohimaa et al. | |
| 2006/0226297 A1 | | 10/2006 | Perez-Sanchez | |
| 2008/0008521 A1 | * | 1/2008 | Naik et al. | 403/255 |
| 2008/0099601 A1 | | 5/2008 | Christman | |

* cited by examiner

*Primary Examiner* — Galen Barefoot
(74) *Attorney, Agent, or Firm* — Armstrong Teasdale LLP (57) ABSTRACT

An airplane fairing panel adjustable fitting assembly allows for installation and removal of a fairing panel from outside the fairing. Blind retention features are provided and a pivoting link structure is facilitated to accommodate flexing of an aircraft structure in use. Kits and methods of attaching fairing panels are also disclosed.

20 Claims, 9 Drawing Sheets

AIRPLANE FAIRING PANEL ADJUSTABLE FITTING ASSEMBLY, KIT AND METHOD

BACKGROUND OF THE DISCLOSURE

The field of the disclosure relates generally to panel mounting systems, and more specifically to the mounting of airplane fairing panels to a support frame of an aircraft.

Aerodynamic features on aerospace vehicles may be formed by lightweight composite panels that are attached to the vehicle airframe. For example, aerodynamic pressure fairings are often formed from large, reinforced honeycomb panels that may be connected together and attached by struts to an airframe. Most fairing panels are supported by frames around the edges of the panels, sometimes with single point attachments. The frames are typically attached to the aircraft structure at fixed positions, usually near an edge of the fairing panel, with little or no provisions for flexing of the fairing and structure. In order to cover large spans, thicker and/or higher density panels are generally required in order to react loads across the span, however these thicker panels undesirably increase the weight of the aircraft.

BRIEF DESCRIPTION

In one embodiment, an adjustable fitting assembly for an airplane fairing panel is disclosed. The panel has an inboard side, an outboard side, and fastener holes extending through the panel from the inboard side to the outboard side. The adjustable fitting assembly comprises a panel fitting configured to engage the inboard side of the fairing panel. The panel fitting comprises a nut plate and a slot for rotating the nut plate with respect to the inboard side of the panel, thereby facilitating alignment of the nut plate with the fastener holes from the outboard side of the panel.

Optionally, the assembly may further comprises a locating tool configured to be inserted into the slot for locating the panel fitting with respect to the inboard side of the fairing panel. A flexible locating cord may be attached to the locating tool. The locating tool may comprise a threaded rod that is receivable in the slot. The assembly may also comprise a support fitting attachable to the panel fitting. The support fitting may comprise an eyebolt. A pivotal link may be coupled to the support fitting. The nut plate may comprise a plurality of retainer nuts, with the fitting assembly further comprising a plurality of fasteners extendable through the fastener holes and cooperating with the retainer nuts to fasten the panel fitting to the inboard side of the panel. The fasteners may extend through the fastener holes from the outboard side of the panel to engage the nut plate. The slot may comprise a shaft portion and an elongated portion, with the shaft portion adapted for receiving a locating tool for positioning the panel fitting to the inboard side of the panel, and the elongated portion adapted to receive a rotating tool for aligning the panel fitting with the fastener holes.

In another aspect, an airplane fairing panel fastening kit is disclosed. The kit comprises: an airplane fairing panel having an inboard side, an outboard side, and a first set of fastener holes extending through the panel from the inboard side to the outboard side; an adjustable fitting assembly comprising a panel fitting configured to engage the inboard side of the fairing panel, the panel fitting having a second set of fastener holes and a slot for rotating the panel fitting with respect to the inboard side of the panel; and a locating tool configured to be inserted into the slot for locating the panel fitting with respect to the inboard side of the fairing panel.

Optionally, the fastening kit further comprises a support fitting attachable to the panel fitting. A flexible locating cord may be attachable to the locating tool for positioning the adjustable fitting assembly to the inboard side of the panel. A rotating tool may be configured to be inserted into the slot. The kit may further comprise a pivotal link. The panel fitting may comprise a nut plate having a plurality of retainer nuts, with the second set of fastener holes respectively aligned with each of the retainer nuts. The kit may comprise a plurality of fasteners extendable through the first set of fastener holes, the second set of fastener holes and cooperating with the retainer nuts to fasten the panel fitting to the inboard side of the panel.

In still another aspect, a method of fastening an airplane fairing panel to a support frame is disclosed. The method comprises providing an airplane fairing panel having an inboard side and an outboard side, the panel including a fitting aperture and fastener holes extending through the panel from the inboard side to the outboard side. The method also comprises providing an adjustable fitting assembly including a panel fitting having a nut plate with a plurality of retainer nuts, a locating tool coupled to the panel fitting, and a flexible locating cord attached to the locating tool. The method includes inserting the locating cord through the panel fitting aperture from the inboard side of the panel to the outboard side of the panel; pulling the locating cord from the outboard side of the panel until the panel fitting engages the inboard side of the fairing panel and the locating tool extends through the fitting aperture and protrudes from the outboard side of the panel; removing the locating tool from the panel fitting; rotating the fitting assembly from the outboard side of the panel until the nuts are aligned with the fastener holes; and inserting fasteners through the fastener holes from the outboard side of the panel to engage the nuts and fasten the panel fitting to the inboard side of the panel.

Optionally the panel fitting includes a slot, and the method includes rotating the fitting assembly comprises inserting a rotating tool into the slot and rotating the panel fitting, wherein the rotating tool is different from the locating tool. The adjustable fitting assembly may further comprises a support fitting, with the method further including attaching the support fitting to the panel fitting. A pivotal may be provided to connect the fairing panel to the support frame, and the method may include connecting the pivotal link to the support fitting.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Exemplary embodiments of fairing panel fitting assemblies, kits and methods of fastening fairing panels are disclosed that among other things, facilitate direct attachment to fairing panels at locations apart from the panel edges, while allowing panel removal and installation without direct access to the support struts, sometimes referred to as links or tie rods, that support the panels. This is achieved at least in part with an adjustable fitting assembly that may be rather easily attached or unattached to support struts from locations outside the fairing. In one embodiment, a two piece adjustable fitting assembly enables a structural aerodynamic surface or fairing panel to be attached from the outer moldline of the panel to a pivoting tie rod or fixed support. The fitting assembly further provides a degree of freedom of movement of the support struts relative to the panel structure to accommodate flexing of the aircraft structure in use.

The adjustable fitting assemblies accommodate use of larger, but lighter, honeycomb fairing panels. The use of larger panels likewise reduces a number of support frames required to support the fairing and the number of panels in the fairing itself, saving weight and associated costs of the materials no longer needed. Aerodynamic drag of the fairing is also improved by reducing the number of joints and fasteners reducing airframe weight, and accordingly reducing operating costs of the aircraft.

Referring first to FIGS. 1-8, an exemplary aircraft fairing generally indicated by the numeral 20 may include one or more lightweight, composite panels 22 fastened along their peripheries to a supporting frame 24. The panels 22 generally include an inner mold line or inner side referred to herein as an inboard side 23 (FIG. 1) and an outer mold line or outer side referred to herein as an outboard side 25 (FIG. 2) opposing the inboard side 23. The inboard side 23 faces the aircraft when the panel 22 is installed, and the outboard side 25 faces away from the aircraft when installed. As such, the outboard side 25 is generally visible from a location exterior to the aircraft, while the inboard side 23 is generally not visible from a location exterior to the aircraft. The inboard and outboard sides 23 and 25 therefore correspond to interior and exterior surfaces when the panel 22 is installed.

As will be discussed below in more detail, a medial region 28 of the panel 22, located at a distance from the outer periphery of the panel 22 may be reinforced by a solid laminate plank 56 which functions to transfer pressure loads out of the panel 22 in order to provide moment continuity, and efficiently allow the link 26a to remove transverse shear loads from the panel 22. The supporting frame 24 at the periphery of the panel 22 may, in turn, be attached by struts 26 to the aircraft's airframe (not shown). As shown in the Figures, a medial region 28 of the panel 22 is supported on the frame member 24a (FIGS. 2 and 3) by a strut-like, rigid link 26a. Attachment of the link 26a to the medial region 28 provides several benefits.

For example, by supporting the panel 22 in the medial region 28 as well as the panel periphery, larger panels may be used having a reduced thickness or density than would otherwise be necessary, thereby realizing weight savings. The structural support of the panel 22 in the medial region 28 allows lighter weight panels to be used while still capably managing pressure loads across the fairing 20. By using fewer, but larger, panels supported in the medial regions 28, cost savings are possible for the aircraft. Additionally, supporting the panel 22 in the medial region 28 facilitates supporting of the fairing panels with approximately the same number of struts 26, sometimes referred to as tie rods or links, as were used with smaller, heavier and conventional fairing panels, facilitating desired weight and cost reductions without significant redesign of the aircraft support structure. The attachment of the link 26a to the medial regions 28 of the panel 22 also results in less deflection or pillowing of the panel 22, which in turn reduces parasitic drag from the fairing 20, thereby improving fuel economy and lowering operating costs of the aircraft in use.

Supporting the panel 22 in the medial region 28 also presents some challenges. The fairing panels may be attached to links 26a that extend some distance beyond the aircraft structure and need some degree of flexibility of freedom of movement as the air structure flexes in use. Achieving such flexibility in a cost effective manner has until now been difficult, and has been a limiting factor in supporting a panel 22 in the medial region 28. Also, because of the distance of the link 26a from the edges of the panel 22, the area of connection between the panel 22 and the strut-like links 26a can be difficult to access and reliably secure.

Figure 1:
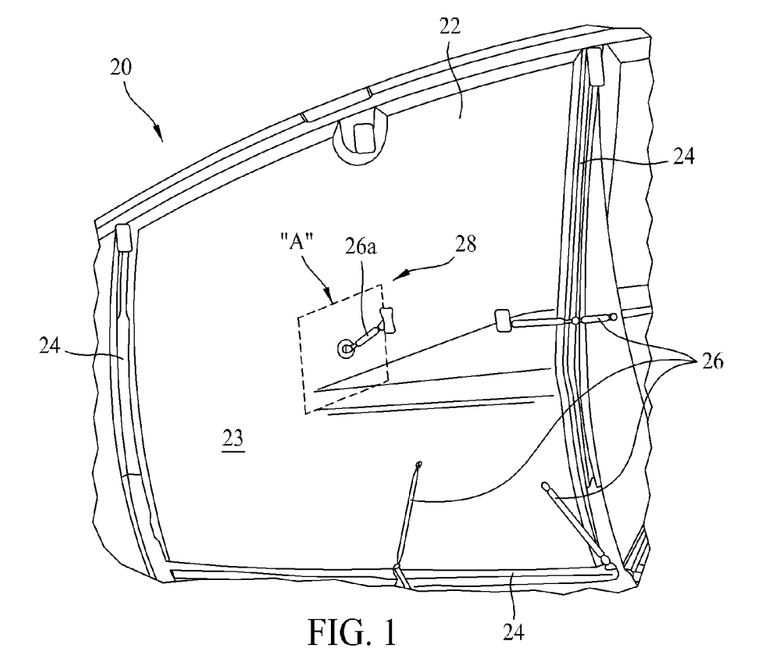
FIG. 1 is a perspective view of an inboard side of a portion of an airplane fairing, depicting a support strut attached to a medial region of a panel.
Figure 2:
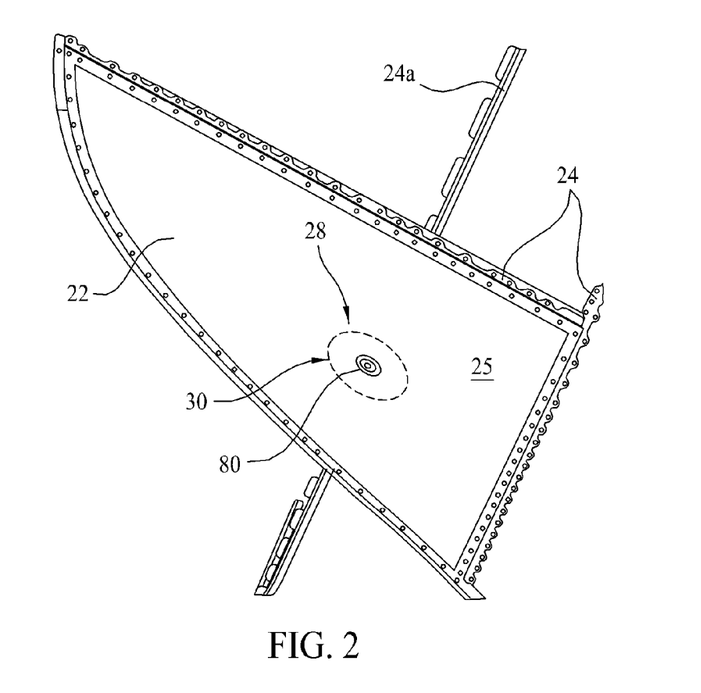
FIG. 2 is an elevational view of the outboard side of portion the fairing shown in FIG. 1.
Figure 3:
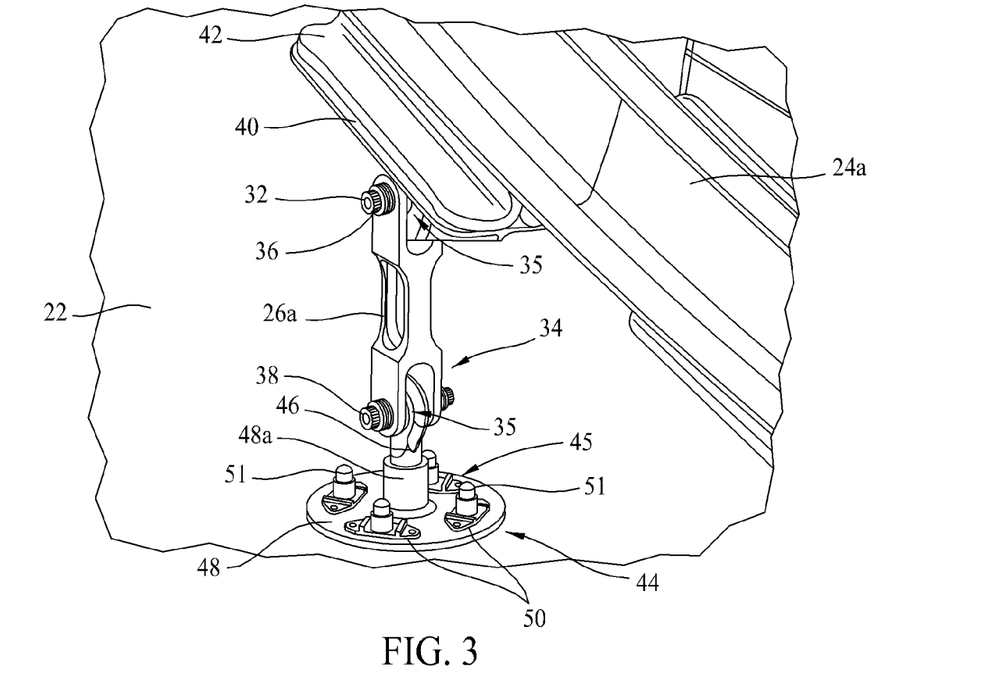
FIG. 3 is a perspective view showing details of the attachment of the strut between the panel and a frame member.
Figure 4:
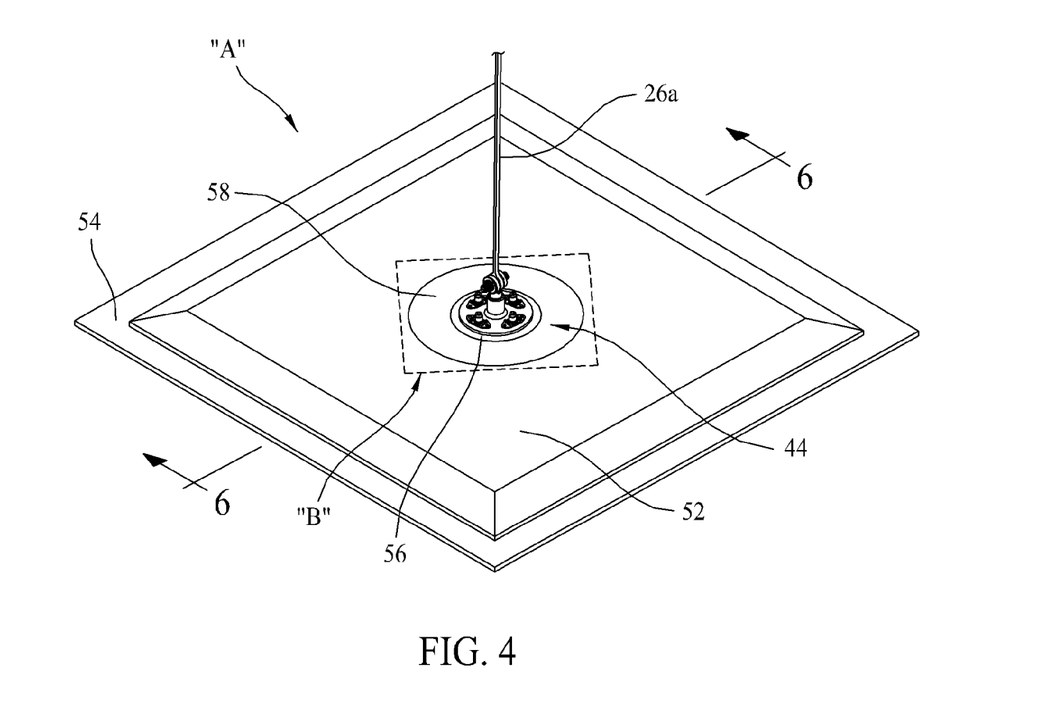
FIG. 4 is an enlarged view of the area indicated as "A" in FIG. 1.

In one embodiment, shown in FIG. 3, the link 26a includes clevises 32, 34 and pins 36, 38 at its opposite ends. Pins 36, 38 may pass through spherical bearings 35 which connect the link 26a between an attachment fitting 40 and an adjustable fitting assembly 44 described in detail below. The attachment fitting 40 may in turn be secured to the frame member 24a by an angle adaptor 42 which effectively adjusts the position of the axis of the pin 36 relative to the frame member 24a. The spherical bearings 35 allow the fairing 20 to move along multiple axes relative to the frame member 24a, thus allowing the fairing 20 to flex somewhat in response to airflow loads and fuselage motion. Such attachment to a pivoting link 26a, rather than a fixed support, allows the panel 22 to be used in additional locations and applications than otherwise might be possible using conventional fairing panels and fittings. While a pivoting link 26a certainly has its advantages, it is contemplated that the panels 22 could be attached to a fixed support at the medial region 28 in another embodiment if desired.

The adjustable panel attachment fitting assembly 44 includes a panel fitting 45 and a support fitting 46. The panel fitting 45 and the support fitting 46 may be machined or molded components and may be separately fabricated from one another in an exemplary embodiment. In another embodiment, the panel fitting 45 and the support fitting 46 may be integrally formed in a unitary fashion if desired.

In exemplary embodiments, the panel fitting 45 is adapted with blind retention features in the form of a generally annular nut plate 48 carrying threaded retainer nuts 50 that receive fastener bolts 51 which pass through the panel 22 to secure the panel fitting 45. As shown in the Figures, the fastener bolts 51 extend through the panel 22 from the outboard side 25 of the panel 22 toward the inboard side 23 of the panel until the fastener bolts 25 engage the threaded retainer nuts 50 and hold the panel fitting 45 against the inboard side 23 of the panel 22. It is appreciated, however, that various other types of fasteners, including but not limited to rivets, blind rivets, screws, pins, and the like may alternatively be utilized to secure the panel fitting 45 to the panel 22 in other embodiments.

A support fitting 46 in the form of, for example, a threaded eyebolt as shown in the Figures is received in the panel fitting 45 with threaded engagement. It is contemplated, however, that other types of engagement besides threaded engagement may be utilized between the panel fitting 45 and the support fitting 46, and also that other types of support fittings may alternatively be provided in lieu of a threaded eyebolt. In the exemplary embodiment depicted in the Figures, the support fitting 46 is connected at one end to the link 26a by the pin 38 and clevis 34, and is threadably received within a threaded, cylindrical body 48a extending from the nut plate 48 of the panel fitting 45. As will be described in more detail below, when the fastener bolts 51 are not in place, the panel fitting 45 may be adjustably fitted to the inboard side 23 of the panel 22 for convenient installation of the panel without having to access the inboard side 23. That is, the panel fitting 45 is accessible from the outboard side 25 and is rotatable relative to the inboard side 23 of the panel 22 about an axis parallel to the cylindrical body 48a of the panel fitting 45 to adjust the relative position of the panel fitting 45 with respect to the panel 22.

Figure 5:
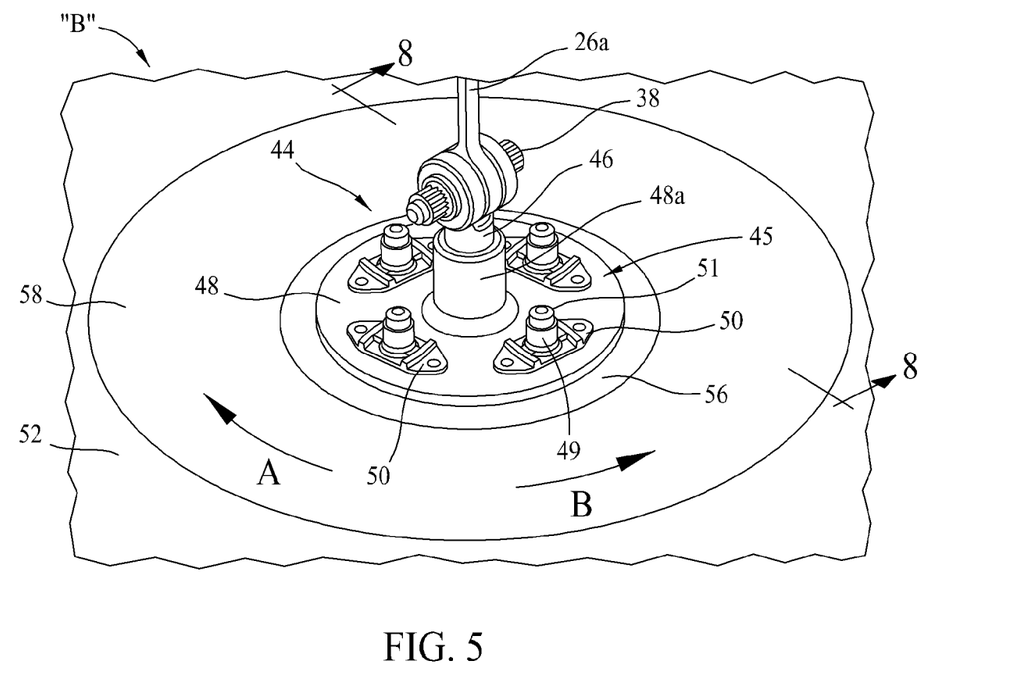
FIG. 5 is an enlarged view of the area designated as "B" in FIG. 4.
Figure 6:
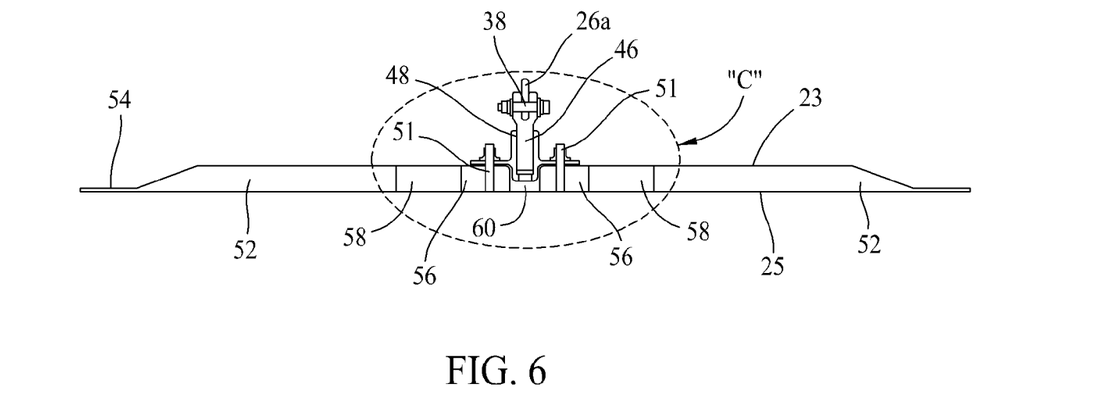
FIG. 6 is a sectional view taken along the line 6-6 in FIG. 4.
Figure 7:
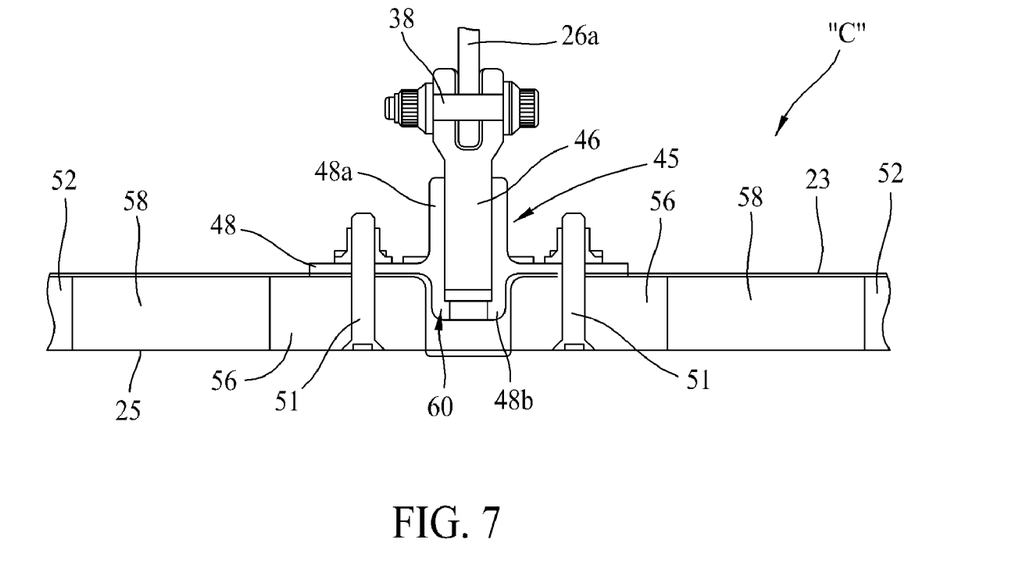
FIG. 7 is an enlarged view of the area designated as "C" in FIG. 6.

More specifically, the panel fitting 45 is rotatable in either of a clockwise direction indicated with arrow A in FIG. 5, or a counter-clockwise direction as indicated with arrow B in FIG. 5, in order to align the panel fitting 45 with respect to the inboard side 23 of the panel 22, and also to adjust the axial position of the link 26a as the panel 22 is installed. Moreover, the panel fitting 45 is rotatable to adjust its position from the outboard side 25 of the panel 22 providing generally unobstructed access to secure the fastener bolts 51. The adjustable fitting assembly 44 eliminates shimming during panel fit-up that may otherwise be necessary, and facilitates blind installation to the panel 22.

Referring now to FIGS. 9-14, in an exemplary embodiment, the fastener bolts 51 pass through respective fastener through-holes or apertures 86 in the panel 22 which surround and are generally evenly spaced from a central, countersunk fitting through-hole or aperture 60. While four fastener holes 86 are shown, it is understood that greater or fewer than four fastener holes may alternatively be provided at equal or unequal spacing from one another. A sleeve 88, which may comprise, for example a corrosion resistant steel, may be bonded or swaged within the central through-hole 60. A lower end 48b (FIG. 14) of the cylinder 48a of the panel fitting 45 passes through the sleeve 88 and includes an opening or slot 48c that is adapted to receive the end of a locating tool 90. More specifically, the slot 48c includes a centrally located substantially cylindrical threaded bore 49a and elongated blade portions 49b on opposing sides of the threaded bore 49a. As such, the slot 48c is shaped and dimensioned to receive more than one tool as the panel 22 is being installed.

Figure 15:
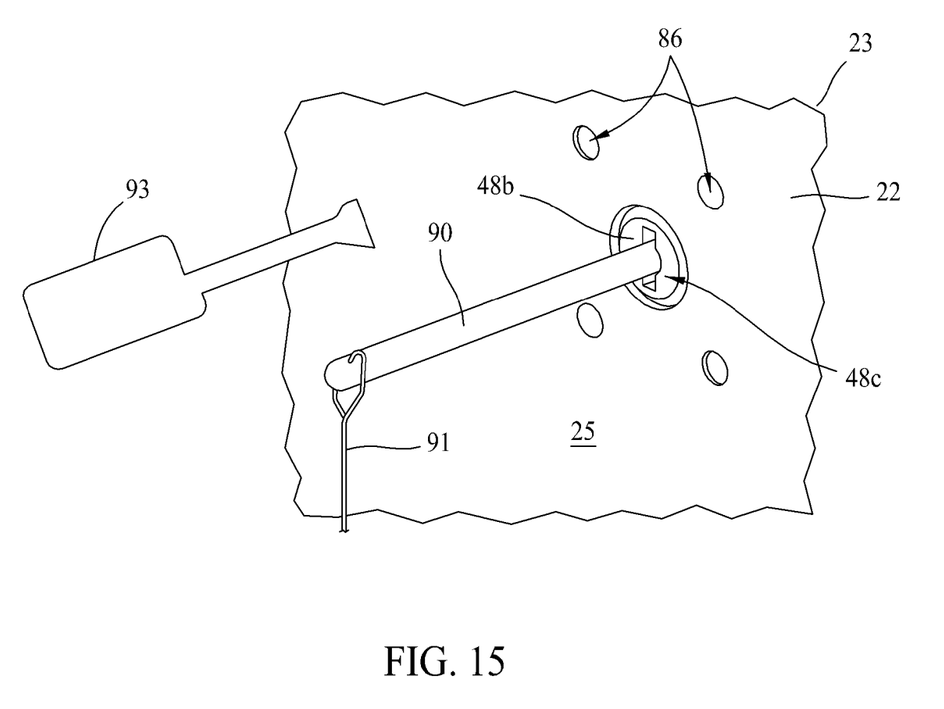
FIG. 15 is a perspective view showing a tool having been inserted into the position adjuster from outside the panel.

As shown in FIG. 15, the locating tool 90 may be a generally cylindrical shaft or rod having a threaded end that is receivable in the bore 49a of panel fitting slot 48c. The locating tool 90 may be fabricated from a metallic material according to known techniques, or from other known material or technique familiar in the art as desired. A flexible locating cord 91 is attachable to the locating tool 90 at an end opposing the panel fitting 45. In the example depicted, the locating cord 91 is threaded through a transverse through-hole in the end of the locating tool 90. Any known flexible material may be used as the locating cord 91, including but not limited to string, rope, wire, cabling or other cord materials that are flexible or bendable along their axial lengths.

The locating tool 90 may be used to position the panel fitting 45 relative to the panel 22 as follows. After attaching the locating tool 90 to the panel fitting 45 via the slot 48c, an end of the locating cord may be passed, from the inboard side 23 of the panel 22 through the fitting aperture 60 in the panel 22 such that the locating cord 91 projects from the outboard side 25 of the panel. The locating cord 91 may then be pulled, from a location exterior to the outboard side 25, through the fitting aperture 60 until the locating tool 91 is proximate the fitting aperture 60. With further pulling of the locating cord 91, the locating tool 91 may also be extended through the fitting aperture 60 from the inboard side 23 of the panel 22 to and through the outboard side 25, drawing the lower end 48b of the panel fitting cylindrical body into the countersunk fitting aperture 60 as shown in FIG. 15. In this position, the locating tool 91 may be removed, and a rotating tool 93, such as a regular, flat blade screwdriver or another tool may be inserted into the slot 48c and turned to rotate the panel fitting 45 in the direction of arrow A or B (FIG. 5) until the nut plate 48 of panel fitting 45 is aligned with the fastener apertures 86 of the panel 22 such that the retainer nuts 50 are accessible through the fastener apertures 86. When so aligned, the fastener bolts 51 may be extended through the fastener apertures 86 from the outboard side 25 of the panel 22 toward the inboard side 23 of the panel 22 until the fastener bolts 51 are engaged with the retainer nuts 50 and may be secured to the retainer nuts 50. While different locating tools 90 and rotating tools 93 have been described, it is contemplated that the function of both tools could be combined in a single tool in another embodiment.

Rotation of the nut plate 48 axially displaces the support fitting 46 as well as the link 26a as the panel is being installed. The rotation of the nut plate 48 allows a shimless installation and fastener alignment of the panel 22. Since the nut plate 48 is threadably held on the end of support fitting 46, the nut plate 48 remains fastened to the link 26a when the fairing panel 22 is removed for servicing or other purposes. The use of the panel attachment fitting assembly 44 allows the fairing panel 20 to be removed and reinstalled without requiring access to the inside of the fairing 20.

In order to protectively enclose the through-hole 60 as well as the fastener bolts 51, a circular cover 94 is provided, which may be formed of a flexible, but durable material such as nylon. The cover 94 includes a tubular portion 96 that is received within sleeve 88. A retainer bolt 98, which also may comprise a nylon material, passes through the center of the cover 90 into the key-like opening 48c in order to hold the cover 90 against the outer surface of the panel 22.

In accordance with the disclosed embodiments, point loads imposed on the panel 22 resulting from the attachment of the link 26a to medial regions 28 are laterally distributed through at least a portion of the panel 22. The medial regions 28 of the panel 22 are effectively reinforced by the plank 56 which forms part of the core 62 of the panel 22. The plank 56 may comprise, for example, a solid, rigid material formed by laminated plies of a composite material such as fiber reinforced resin, i.e., a solid laminate. The use of a plank 56 formed from a solid laminate allows the panel 22 to carry higher out-of-plane shear loads and bending loads compared to other types of core constructions. In the illustrated example, the plank 56 is circular in shape and is slightly larger in diameter than the diameter of the nut plate 48. Other geometries, however, are possible, although a circular geometry aids in uniformly transferring moments in any radial direction through the plane of the panel 22.

The solid plank 56 is effectively embedded in, and forms an integral part of the honeycomb panel core 62, enabling the link 26a or similar strut/tie-rod to be directly attached to the middle of the panel 22 while remaining capable of reacting large out-of-plane loads. The nut plate 48 can be directly attached to the plank 56 and then adjusted to fit against the panel 22 from outside of the fairing 20 using the adjustable panel attachment fitting 44. The plank 56 may be either precured or uncured (green) when it is inserted into the honeycomb panel core 62. The plank 56 is then co-cured with or co-bonded to the honeycomb core assembly 62 during fabrication of the panel 22.

The core 62 may further include a ring shaped honeycomb section 58 surrounding and attached to the sides of the plank 56. The ring shaped honeycomb section 58 is surrounded by another honeycomb section 52. In one embodiment, the density of the core section 58 is less than that of the plank 56 but greater than the density of the core section 52. For example, in one application providing satisfactory results, the plank 56 may include sixty laminated plies of fiberglass, core section 58 comprises a heat resistant phenolic honeycomb having a density of eight pounds per cubic foot, and core section 52 is also a heat resistant phenolic honeycomb having a density of three pounds per cubic foot. Where the plank 56 is green (uncured) during the assembly phase, the honeycomb core section 58 may be attached by co-curing plank 56 and core section 52 using a suitable foam adhesive which forms a splice 84 (see FIG. 8).

Figure 8:
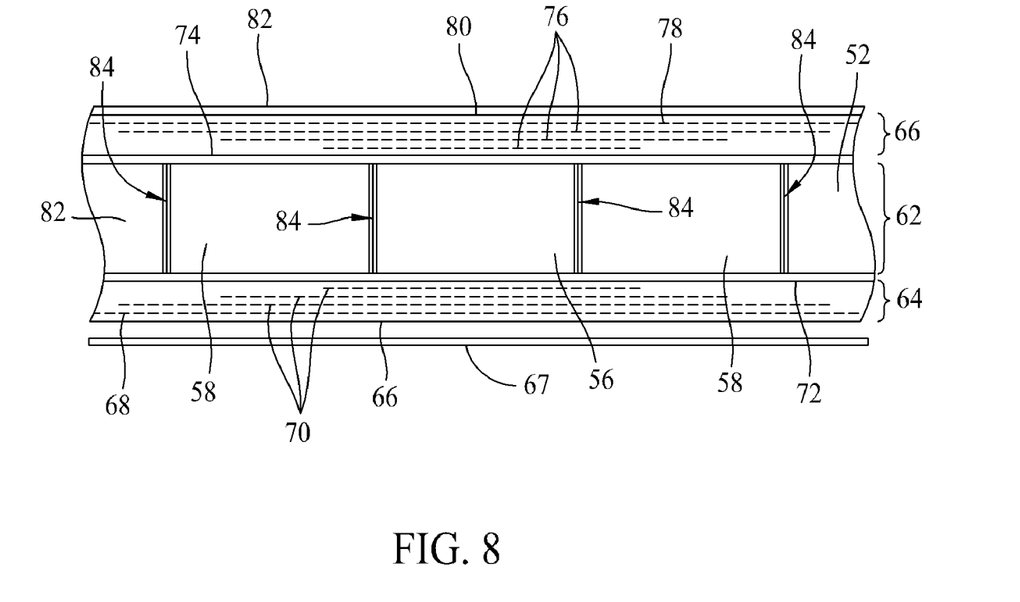
FIG. 8 is a diagrammatic, sectional view showing a layup used for forming the composite panel.
Figure 9:
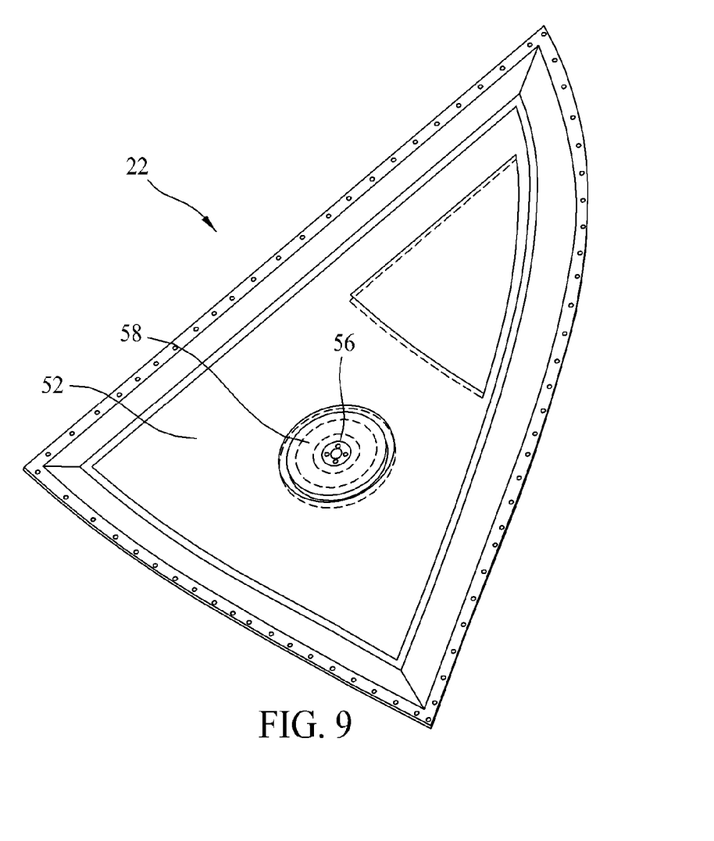
FIG. 9 is a perspective view of the panel before the strut has been attached.
Figure 10:
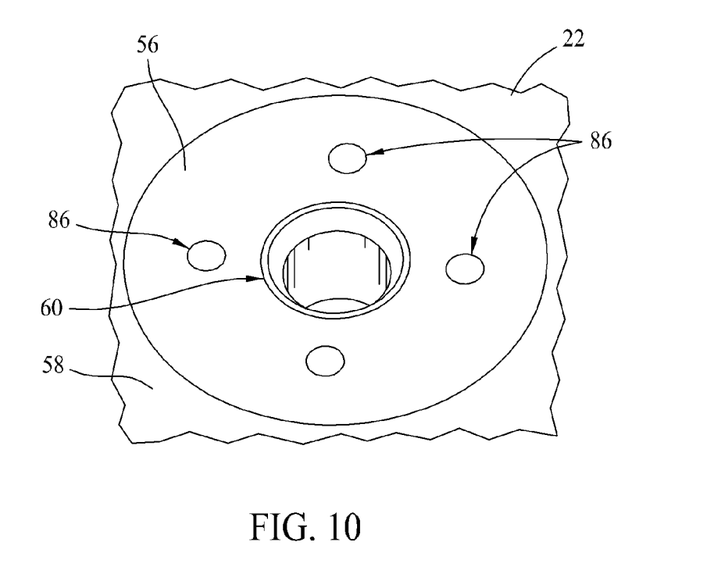
FIG. 10 is an enlarged view showing the formation of mounting holes in the panel illustrated in FIG. 9.
Figure 11:
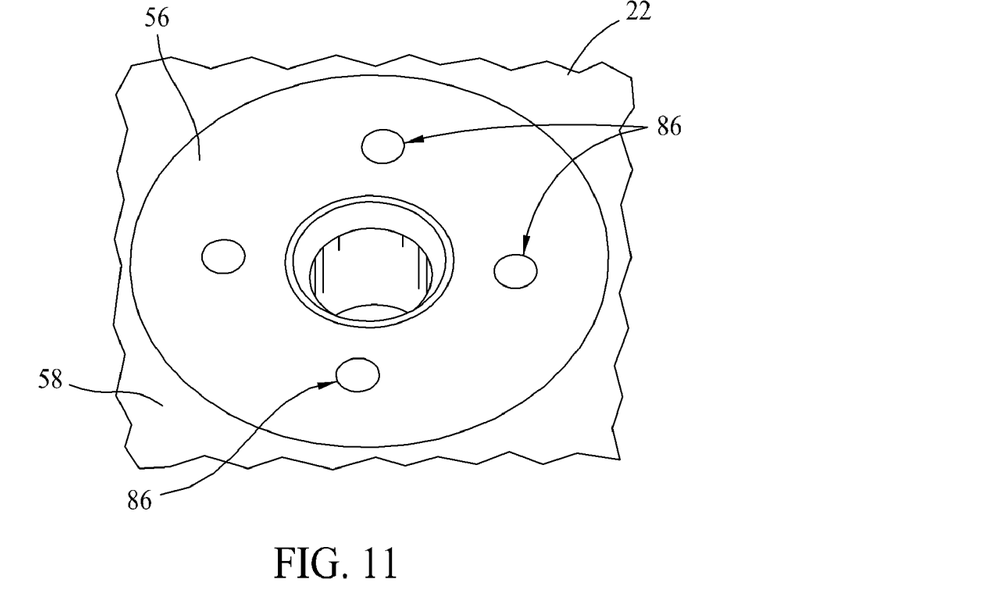
FIG. 11 is a view similar to FIG. 10 but showing the installation of a sleeve in the center hole.
Figure 12:
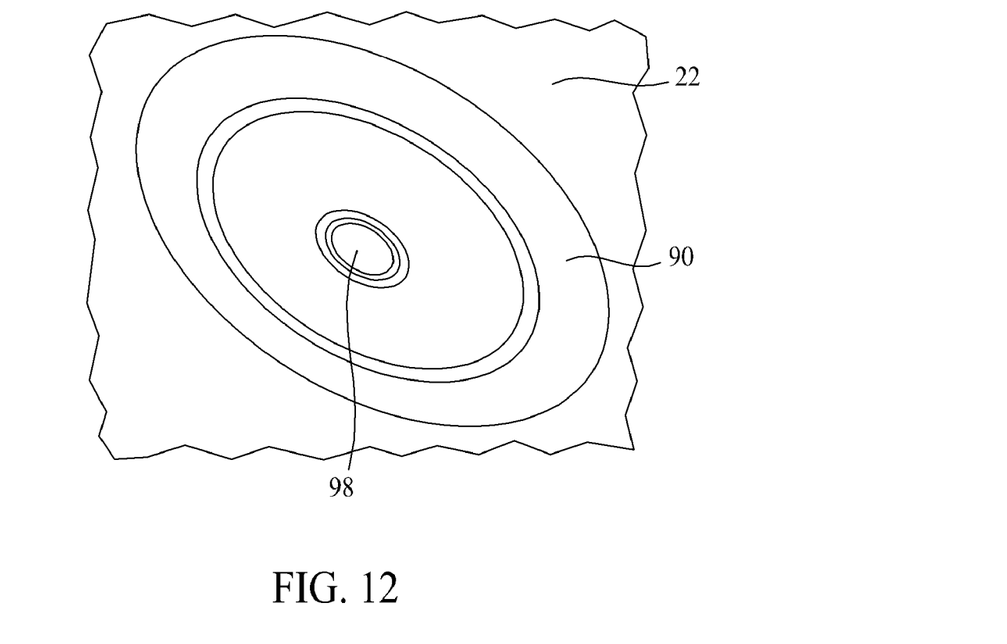
FIG. 12 is a perspective view showing the front of a cover installed over the outboard side of the center hole.
Figure 13:
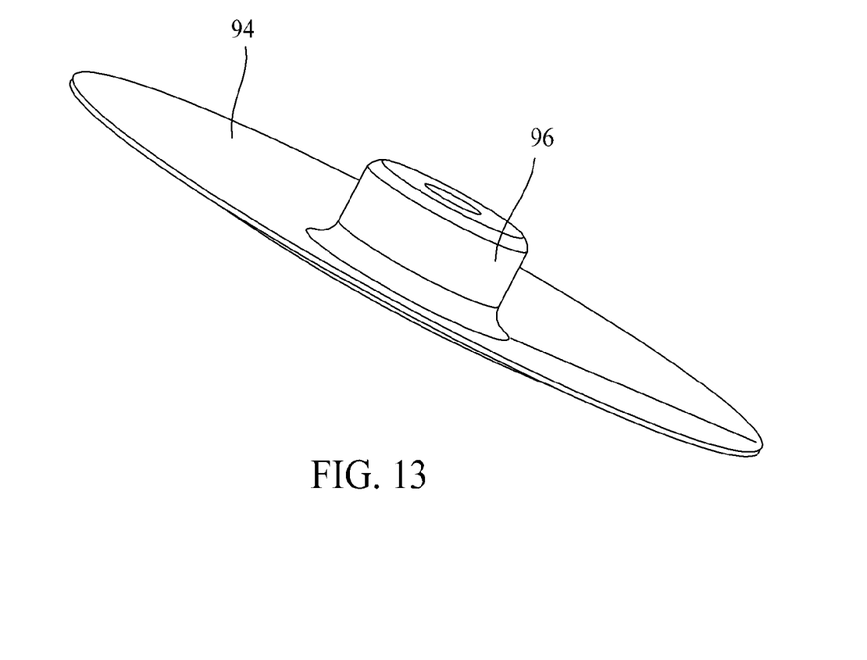
FIG. 13 is a perspective view showing the rear side of the cover shown in FIG. 12.
Figure 14:
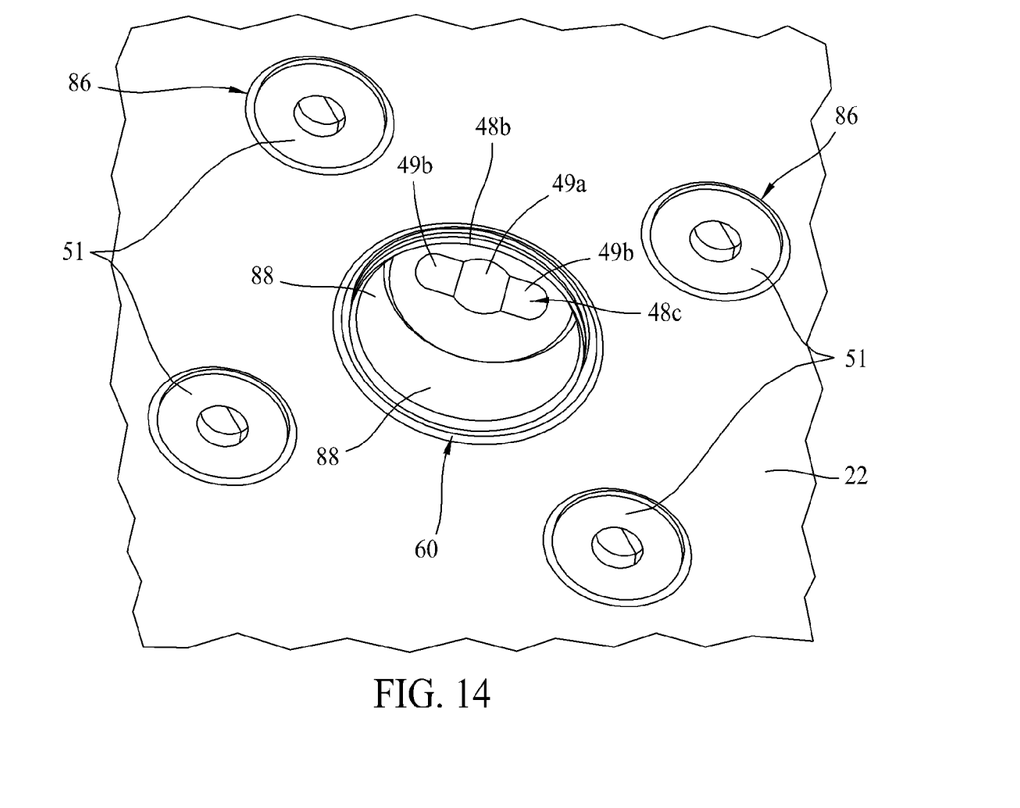
FIG. 14 is an enlarged view of the outer surface of the panel, and showing strut attachment fasteners and a position adjuster accessed from outside the panel.

FIG. 8 shows additional details of the layers that form the reinforced area 52 on the outer skin 54 of the panel 22. The core 62 formed by the co-bonded or co-cured plank 56 and honeycomb sections 52, 58 are sandwiched between laminated plies 64, 66 which may comprise any of various fiber reinforced resins, such as fiberglass. The laminated plies 64 may include multiple drop-off plies 70 sandwiched between full plies 68, 72. Similarly, the outer group of laminated plies 66 may include drop-off plies 76 sandwiched between full plies 74, 78. The drop-off plies 70-76 in the region overlying the plank 56 and the high density honeycomb section 58 are intended to reinforce the medial regions 28 of the panel 22 where the link 26a is attached to the panel 22. A surfacer 66 may be applied to the outboard side of the panel 22, covering the laminated plies 64 in order to achieve a desired smoothness.

While an exemplary panel 22 has been disclosed, it is appreciated that various other types of panels, whether or not having a plank, may be utilized in other embodiments. It is recognized that fairing panels may be fabricated form a variety of materials and in a wide variety of shapes and contours for different parts of the aircraft, or for different configurations of aircraft.

Figure 16:
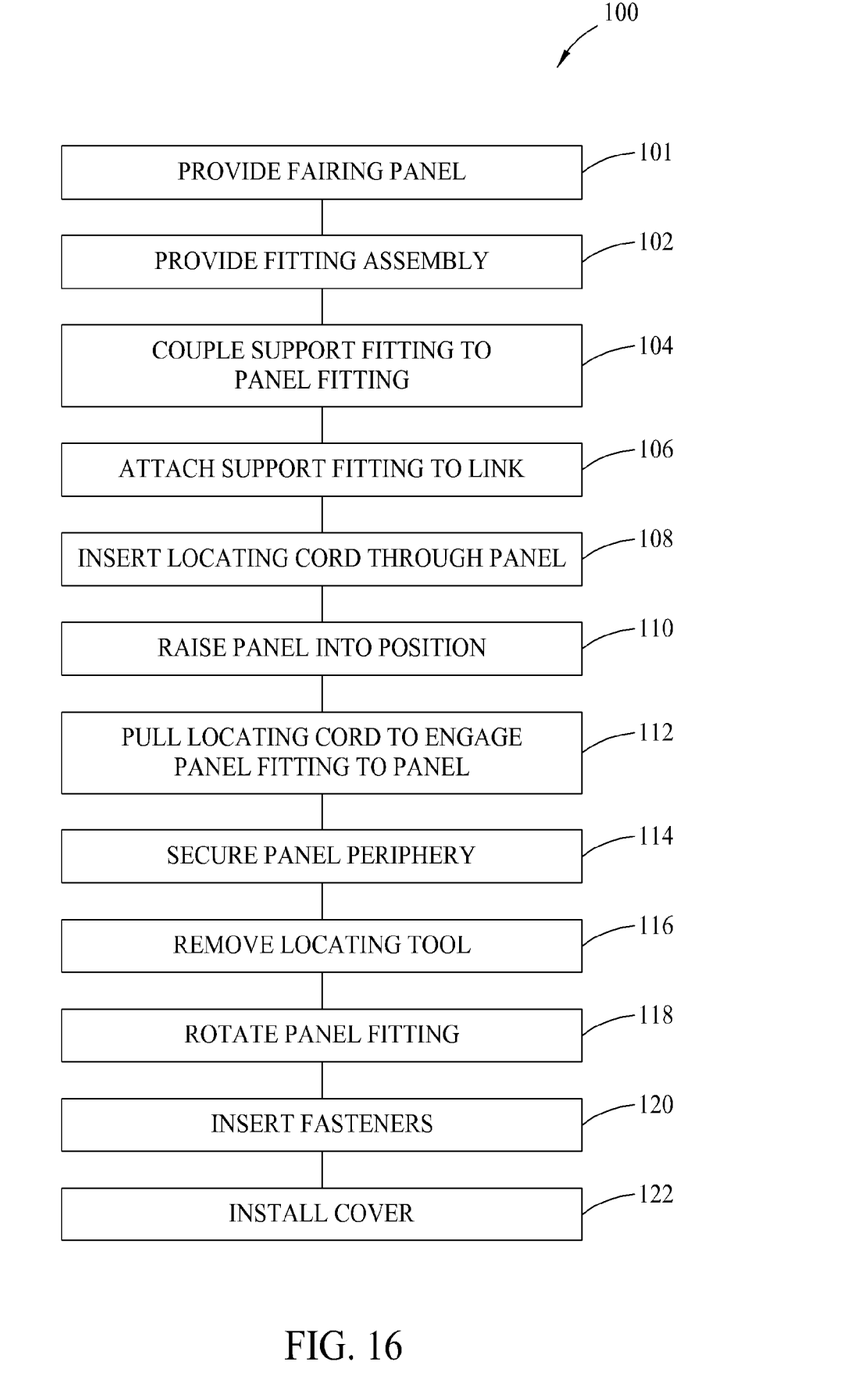
FIG. 16 is a method flow chart illustrating a method of attaching a fairing panel to an airframe.

Referring now to FIG. 16, an exemplary method 100 of fastening an airplane fairing panel to a support frame will be discussed. The method 100 includes providing 101 an airplane fairing panel such as the panel 22 having an inboard side 23 and an outboard side 25, the panel including a fitting aperture 60 and fastener holes 86 extending through the panel from the inboard side to the outboard side. The method also includes providing 102 an adjustable fitting assembly such as that described above including a panel fitting 48 having, for example, a nut plate 48 with a plurality of nut retainers 50 (or other retainer elements for different fasteners), a locating tool 90 coupled to the panel fitting, and a flexible locating cord 91 attached to the locating tool 90.

The support fitting 46 may be coupled 104 to the panel fitting 106, and may be attached 106 to the link 26a. The locating cord 91 may be inserted 108 through the panel fitting aperture 60 from the inboard side 23 of the panel 22 to the outboard side 25 of the panel 22 and the panel 22 may be raised 110 into position on the aircraft. The locating cord 91 may be pulled 112 from the outboard side 25 of the panel 22 until the panel fitting 45 engages the inboard side 23 of the fairing panel 22 and the locating tool 90 extends through the fitting aperture 60 and protrudes from the outboard side 25 of the panel 22. The panel 22 may then be raised or otherwise positioned in place and secured 114 to the support frame 24 at the periphery of the panel 22. Ratcheting systems and the like may be utilized in connection with the locating tool or other feature to assist with lifting and supporting of the panels, and may reduce labor needed to install large fairing panels.

The locating tool 90 may be removed 116 from the panel fitting 45, and the fitting assembly 44 may be turned and rotated 118 from the outboard side 25 of the panel using another tool, such as the screwdriver 93, engaged to the slot 48c until the retainer nuts 50 are aligned with the fastener holes 86 in the panel 22. When so aligned, the fasteners 51 may be inserted 120 through the fastener holes 86 from the outboard side 25 of the panel 22 to engage the nuts 50 and fasten the panel fitting 45 to the inboard side 23 of the panel 22. When the fasteners 51 are tightened by an appropriate amount the cover 94 may be installed 122.

If desired, the panel 22 may be removed by removing the cover 94, removing the fasteners 51 and releasing the panel periphery from the support frame 24. When so released, the panel 22 may be removed in a direction away from the aircraft. The ability to remove the panel 22 from outside the fairing, without direct access to the aircraft structure or the attaching link 26, allows for convenient removal and installation of the panel 22 in a reduced amount of time.

The described adjustable fitting assembly 44 and methodology for fastening fairing panels enables greater unitization of fairing panels and additional opportunities for fairing optimization during fairing design. Weight reduction opportunities in the fairing design are available by reducing the number of frames 24 required to support the panels 22 and/or reducing the weight of the panels 22 themselves.

By enabling the use of larger panels 22, the fitting assembly 44 reduces part and fastener counts. Lower fairing design weights, lower procurement and fabrication costs, and higher flow rates in the factory improve manufacturing efficiency and overall assembly costs. The factory flow will be improved by reducing the number of machined frames 24 to be produced and the installation time to install the panels 22 is decreased. Aerodynamic drag of the fairing may be reduced by having fewer gaps that would otherwise exist between smaller panels and lower deflection/span (pillowing) is also reduced. A reduced weight of secondary support structures further allows the performance of the aircraft to improve.

This written description uses examples to disclose the concepts described, including the best mode, and also to enable any person skilled in the art to practice the same, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable fitting assembly for an airplane fairing panel having an inboard side, an outboard side, and fastener holes extending through the panel from the inboard side to the outboard side, the adjustable fitting assembly comprising:
   a panel fitting configured to engage the inboard side of the fairing panel, the panel fitting comprising a nut plate and a slot for rotating the nut plate with respect to the inboard side of the panel, thereby facilitating alignment of the nut plate with the fastener holes from the outboard side of the panel.

2. The adjustable fitting assembly of claim 1, further comprising a locating tool configured to be inserted into the slot for locating the panel fitting with respect to the inboard side of the fairing panel.

3. The adjustable fitting assembly of claim 2, further comprising a flexible locating cord attached to the locating tool.

4. The adjustable fitting assembly of claim 2, wherein the locating tool comprises a threaded rod that is receivable in the slot.

5. The adjustable fitting assembly of claim 1, further comprising a support fitting attachable to the panel fitting.

6. The adjustable fitting assembly of claim 5, wherein the support fitting comprises an eyebolt.

7. The adjustable fitting assembly of claim 5, further comprising a pivotal link coupled to the support fitting.

8. The adjustable fitting of claim 1, wherein the nut plate comprises a plurality of retainer nuts, the fitting assembly further comprising a plurality of fasteners extendable through the fastener holes and cooperating with the retainer nuts to fasten the panel fitting to the inboard side of the panel.

9. The adjustable fitting of claim 1, wherein the fasteners extend through the fastener holes from the outboard side of the panel to engage the nut plate.

10. The adjustable fitting of claim 1, wherein the slot comprises a shaft portion and an elongated portion, the shaft portion adapted for receiving a locating tool for positioning the panel fitting to the inboard side of the panel, and the elongated portion adapted to receive a rotating tool for aligning the panel fitting with the fastener holes.

11. An airplane fairing panel fastening kit comprising:
    an airplane fairing panel having an inboard side, an outboard side, and a first set of fastener holes extending through the panel from the inboard side to the outboard side;
    an adjustable fitting assembly comprising a panel fitting configured to engage the inboard side of the fairing panel, the panel fitting having a second set of fastener holes and a slot for rotating the panel fitting with respect to the inboard side of the panel; and
    a locating tool configured to be inserted into the slot for locating the panel fitting with respect to the inboard side of the fairing panel.

12. The airplane fairing panel fastening kit of claim 11, further comprising a support fitting attachable to the panel fitting.

13. The airplane fairing panel fastening kit of claim 11, further comprising a flexible locating cord attachable to the locating tool for positioning the adjustable fitting assembly to the inboard side of the panel.

14. The airplane fairing panel fastening kit of claim 11, further comprising a rotating tool configured to be inserted into the slot.

15. The airplane fairing panel fastening kit of claim 11, further comprising a pivotal link.

16. The airplane fairing panel fastening kit of claim 11, wherein the panel fitting comprises a nut plate having a plurality of retainer nuts and the second set of fastener holes respectively aligned with each of the retainer nuts, the kit comprising a plurality of fasteners extendable through the first set of fastener holes, the second set of fastener holes and cooperating with the retainer nuts to fasten the panel fitting to the inboard side of the panel.

17. A method of fastening an airplane fairing panel to a support frame the method comprising:
    providing an airplane fairing panel having an inboard side and an outboard side, the panel including a fitting aperture and fastener holes extending through the panel from the inboard side to the outboard side;
    providing an adjustable fitting assembly including a panel fitting having a nut plate with a plurality of retainer nuts, a locating tool coupled to the panel fitting, and a flexible locating cord attached to the locating tool;
    inserting the locating cord through the panel fitting aperture from the inboard side of the panel to the outboard side of the panel;
    pulling the locating cord from the outboard side of the panel until the panel fitting engages the inboard side of the fairing panel and the locating tool extends through the fitting aperture and protrudes from the outboard side of the panel;
    removing the locating tool from the panel fitting;
    rotating the fitting assembly from the outboard side of the panel until the nuts are aligned with the fastener holes; and
    inserting fasteners through the fastener holes from the outboard side of the panel to engage the nuts and fasten the panel fitting to the inboard side of the panel.

18. The method of claim 17, wherein the panel fitting includes a slot, and rotating the fitting assembly comprises inserting a rotating tool into the slot and rotating the panel fitting, wherein the rotating tool is different from the locating tool.

19. The method of claim 17, wherein the adjustable fitting assembly further comprises a support fitting, the method further comprising attaching the support fitting to the panel fitting.

20. The method of claim 19, further comprising providing a pivotal link to connect the fairing panel to the support frame, and connecting the pivotal link to the support fitting.

* * * * *